United States Patent

[11] 3,620,256

| [72] | Inventor | William J. C. Trythall<br>18 South Parade, Whiteley Bay,<br>Northumberland, England |
|---|---|---|
| [21] | Appl. No. | 5,010 |
| [22] | Filed | Jan. 22, 1970 |
| [45] | Patented | Nov. 16, 1971 |
| [32] | Priority | Feb. 3, 1969 |
| [33] | | Great Britain |
| [31] | | 5,789/69 |

[54] PIPELINE VALVES
4 Claims, 2 Drawing Figs.

[52] U.S. Cl. .................................................. 137/625.48,
277/3
[51] Int. Cl. ...................................................... F16k 11/02,
F16j 15/00
[50] Field of Search ............................................ 137/625.42,
625.48; 277/3

[56] References Cited
UNITED STATES PATENTS

| 1,594,052 | 7/1926 | Draver | 137/625.48 |
| 2,991,803 | 7/1961 | Michie | 137/625.48 X |
| 3,195,726 | 7/1965 | Saurenman et al. | 137/625.48 X |

*Primary Examiner*—Henry T. Klinksiek
*Attorney*—Cullen, Settle, Sloman & Cantor ABSTRACT: A valve for insertion in a pipeline through which material in powdered or granular form is conveyed pneumatically is so constructed that in one setting of the valve the material entering the valve is passed to a discharge outlet of the valve; and in a second setting of the valve said discharge outlet is closed and the material entering the valve flows through the valve and back into the pipeline.

INVENTOR
WILLIAM J.C.
TRYTHALL.

ATTORNEY

PIPELINE VALVES

BACKGROUND OF THE INVENTION

A rapidly expanding method of conveying material from a bulk supply hopper to one or more locations spaced from the bulk supply hopper comprises the use of a blower unit, this blower unit receiving a charge of material from the bulk supply hopper. When the blower has been charged with the requisite amount of material it is sealed off from the bulk supply hopper and thereafter compressed air is used to cause the material in the blower to be blown along a pipeline leading from the blower to the location to which the material is destined to be delivered. The charge may be wet or dry material in powdered or granular form.

Such pneumatically operated conveying systems frequently require one blower to serve as the means for conveying material from the bulk supply hopper to any of a plurality of locations. Thus, for example, the blower may be required to feed solid fuel from a bulk supply hopper to a row of boilerhouse stoker feeders. In such installations it is desirable that a single pipeline extend from the blower to the row of feeders, each feeder being capable of receiving solid fuel from said single pipeline.

It is an object of the present invention to provide a valve that will permit a single pipeline to be used in this manner, that is to say a valve that can be inserted in a pipeline and be capable of moving from a setting in which it will allow material to pass through the pipeline and so bypass the discharge outlet of the valve, to a setting in which the valve will cause material to be delivered from the pipeline to the discharge outlet of the valve.

SUMMARY OF THE INVENTION

The valve disclosed herein comprises a housing, an inlet port in the housing, a first outlet port in the housing, a second outlet port in the housing, a pistonlike body slidable in said housing, the pistonlike body having a first flowpath such that when the pistonlike body is moved to a first setting the second outlet port is closed and said first flow path will cause the inlet port to be placed in communication with the first outlet port; the pistonlike body also having a second flow path such that when the pistonlike body is moved to a second setting the first outlet port is closed and said second flow path will cause the inlet port to be placed in communication with said second outlet port.

DESCRIPTION OF THE PREFERRED EMBODIMENT

As illustrated, the valve comprises a housing 1 in which is slidably disposed a pistonlike body 2 formed with two different flow paths. The first flow path, indicated at 3, extends straight through the body 2 in a direction normal to the direction of movement of the body 2.

Figure 1:
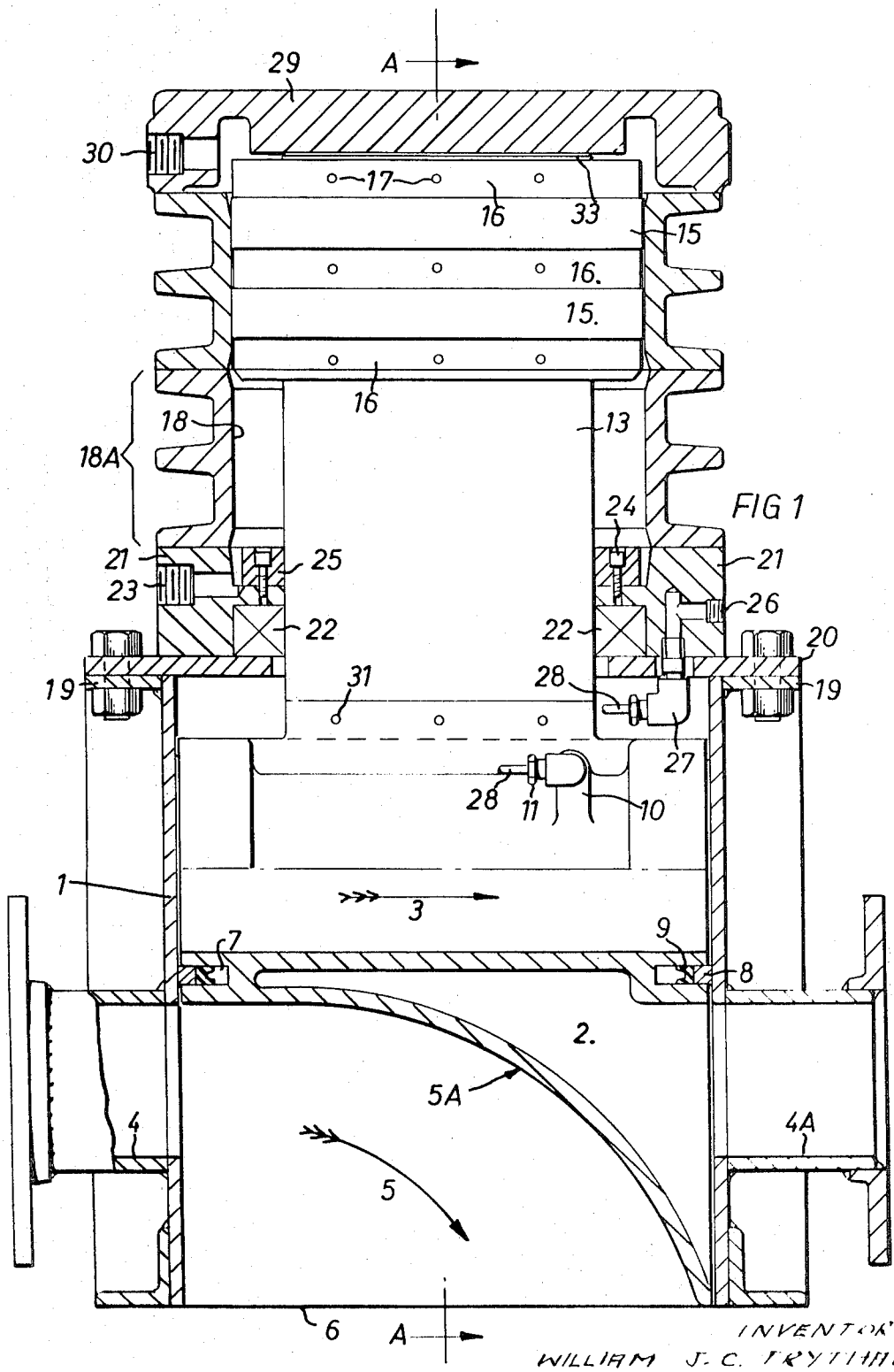
FIG. 1 is a cross-sectional elevation through a valve in a plane containing the direction of flow of material through the valve.
Figure 2:
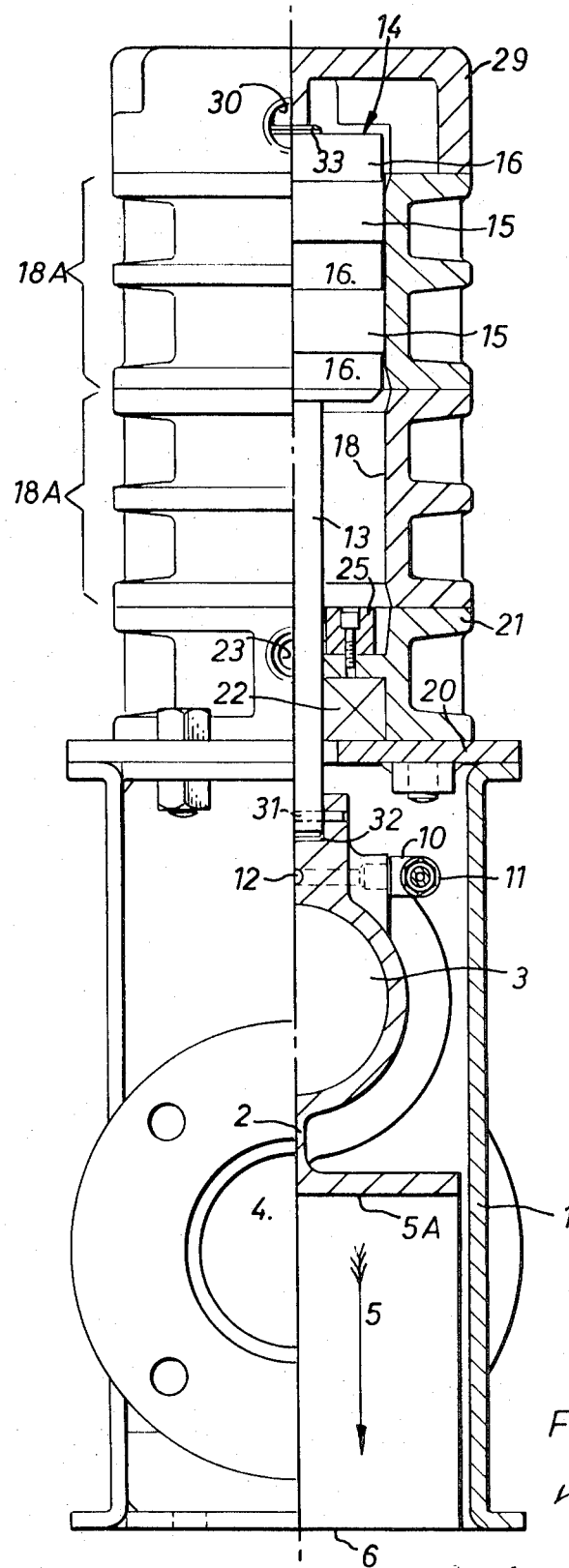
FIG. 2 is an end elevation of the valve, partly in section, looking in the direction of the arrow A in FIG. 1.

The housing 1 is provided in its side walls with an inlet port 4 axially aligned with a first outlet port 4A; the first flow path 3 having the same shape and cross-sectional area as each of the ports 4, 4A. In FIG. 1 the body 2 is in its retracted setting at the upper end of the housing 1 such that the first flow path 3 is spaced away from the opposed ports 4, 4A. By causing the body 2 to move away from this retracted setting, that is to say downwardly in FIG. 1, the first flow path 3 becomes aligned with the ports 4, 4A such that material supplied to inlet port 4 will pass straight to the first outlet port 4A via the flow path 3, and so bypass a second outlet port 6 also referred to hereinafter as a discharge outlet 6. The discharge outlet 6 is at the lower end of the housing 1.

The second flow path, indicated at 5, is at the lower end of the body 2 and is curved such that when the body 2 is in its retracted upper setting as illustrated in FIG. 1, the second flow path 5 will direct material entering the valve via inlet port 4 to the discharge outlet 6. It will be noted from FIG. 1 that when the body 2 is in its upper setting, the second flow path 5 effectively prevents material entering the port 4 from passing out through the port 4A.

The second flow path 5 need not be a channel but can, as illustrated, be defined by a curved surface 5A at one end of the body 2. In this manner the whole of one end of the housing 1 can act as a discharge outlet 6. In the drawing the illustrated curved surface 5A is defined by that surface that would be swept out by a straight line extending in a direction normal to the longitudinal axis of the housing 1 and normal to the longitudinal axis of the first flow path 3, and rotating at a radius abut a point lying below the housing 1 on a line parallel to the longitudinal axis of the housing 1 and extending through the diameter of the inlet port 4 on the inner surface of the housing 1. This curve is, of course, by way of example only and any other suitably curved surface may be used.

The body 2 is formed with a channel 7 at each outer end of the first flow path 3, each channel 7 encircling the flow path 3 and containing a sealing ring 8 backed by a U-shaped packing ring 9, the two limbs of the U shape facing the base of the channel 7. The body 2 is provided with an elbow 10 adapted to receive a connector 11 through which compressed air can be supplied to the elbow 10, there being a bore 12 connecting the channels 7 with the elbow 10. When the body 2 has been lowered from its retracted setting shown in FIG. 1 to the setting in which the flow path 3 is in alignment with the opposed ports 4 and 4A, compressed air can be supplied via the elbow 10 to the channels 7 to cause the U-shaped packing rings 9 to press the sealing rings 8 against the inner surface of the housing 1. In this manner the first flow path 3 is entirely sealed off from the discharge outlet 6 when it is desired to pass material straight through the valve and so bypass the discharge outlet 6.

By making the bore of the housing 1 of rectangular, or substantially rectangular, cross section, and the body 2 of appropriate shape to slide in the bore of the housing 1, there is no tendency for the body 2 to rotate about the longitudinal axis of the bore in the housing 1. Such a rectangular cross section will also permit those faces against which the sealing rings 8 act, to be of planar form.

The body 2 is coupled, at the end remote from the discharge outlet 6, to a blade 13 acting as a piston rod for a piston head indicated generally at 14. The piston head 14 comprises a plurality of resilient seals 15 disposed between distance plates 16 the distance plates 16 being coupled to the blade 13 by means of pins 17. The resilient seals 15 and the distance plates 16 are of rectangular form, the resilient seals 15 being larger in circumference than the distance plates 16.

The cylinder 18, in which the piston head 14 slides, is composed of a plurality of rectangular units 18A coupled end to end (by means not shown) so as to define a single elongated cylinder of internal cross section matching the cross section of the resilient seals 15.

The upper end of the housing 1 is provided with a flange 19 to which is bolted a securing plate 20, the plate 20 being apertured to permit the blade 13 to extend through to the body 2.

Secured intermediate the cylinder 18 and the plate 20 (by means not shown) is a seal housing 21, this seal housing 21 containing a recess in which a resilient seal 22 is housed. The seal 22 acts on the blade 13 to prevent the compressed gas or liquid that is used to move the piston 14 from entering the housing 1.

The seal housing 21 is formed with a bore 23 by means of which a compressed gas or liquid can be supplied to the cylinder 18 to move the piston 14 away from the housing 1. Secured to the seal housing 21, by screws 24, is a distance plate 25, this distance plate being so dimensioned that when the piston 14 abuts against it, the first flow path 3 will be in alignment with the opposed ports 4, 4A.

The seal housing 21 is also provided with a bore 26 through which compressed air can be supplied to an elbow 27. A flexible tube 28 connects the elbow 27 with the elbow 10.

The end of the cylinder 18 remote from the housing 1 is provided with an end cap 29 secured in place by means (not shown), and this end cap has a bore 30 through which a compressed gas or liquid can be fed to the cylinder 18 to move the piston head 14 towards the housing 1. Within the end cap 29 is a distance plate 33 that can be machined to such a thickness that when the piston 14 abuts against it the second flow path 5 will be accurately aligned with the port 4.

The body 2 has a channel 32 into which the blade 13 extends, suitable pins or rivets 31 being used to extend through the body 2 and the blade 13 to secure the two together.

Having now described one particular embodiment of the present invention, it will be appreciated that many modifications may be made thereto without departing from the invention in its widest scope as defined in the appended claims. Thus, for example, the piston and cylinder arrangement need not be of rectangular form, but may be of conventional circular cylindrical form.

The distance plate 25 has been described by way of example only and in some constructions it is not essential. Thus, by ensuring that the seal housing is in itself so designed as to provide a correctly located abutment against which the piston head 14 can abut when in its nonretracted setting, the distance plate 25 becomes superfluous.

It should be appreciated that compressed air is only supplied via the elbow 10 to the channels 7 when the flow path 3 is in alignment with the opposed ports 4 and 4A. When the body 2 is being moved towards the ports 4, 4A; or is being moved away from these ports; there is no compressed air supplied to the channels 7 in order that the body 2 shall have complete freedom of movement. The channels 7 need not necessarily be carried by the body 2. They may, if desired, form part of the housing 1. In such an instance the channels 7 would extend around the ports 4, 4A and the sealing ring 8 in these channels 7 would then be caused to move inwardly towards the body 2 when the first flow path 3 is in alignment with the opposed ports 4, 4A. It is also within the scope of the present invention for a fluid or grease medium to be used to establish a seal between the first flow path 3 and the housing 1 when the first flow path 3 is in alignment with the ports 4, 4A. This could be achieved by filling the cavity behind the sealing ring 8 with a fluid or greaselike material and applying pressure to said fluid or greaselike material when the first flowpath 3 is positioned between the ports 4, 4A.

It is possible for the piston and cylinder arrangement that is used to move the body 2 to and fro to be formed with a cavity in which there is a supply of fluid or grease. This cavity could then be provided with a secondary piston such that when the main piston 14 has been moved upwardly to the setting shown in the drawings, the secondary piston would meet an abutment causing said secondary piston to be forced inwardly into the cavity in which said fluid or grease is stored. The resulting pressure on said fluid or grease could then be transferred to the channels 7 to cause the sealing means 8 to establish the required seal. As soon as the piston 14 is retracted, the secondary piston would be free to move outwardly of the cavity in which it is housed and the resulting pressure in the channels 7 would then be released. The invention is not in any way limited to the particular manner in which pressure is applied to the channels 7 and it will be appreciated that any suitable means may be used to achieve this end.

It will also be appreciated that the flow path through the opposed ports 4, 4A need not be at right angles to the longitudinal axis of the housing 1. It is possible for the axis on which the opposed ports 4, 4A are aligned to be horizontal and for the longitudinal axis of the housing 1 and the cylinder 18 to be inclined at an angle thereto.

It will be appreciated that a plurality of these valves may be included in a single pipeline and by causing any one of these valves to move to its discharge setting the material passing through the pipeline can be discharged from the particular valve that is temporarily adjusted to such a discharge setting.

I claim:

1. A valve comprising a housing, an inlet port in the housing, a first outlet port in the housing, a second outlet port in the housing a pistonlike body slidable in said housing, the pistonlike body having a first flow path such that when the pistonlike body is moved to a first setting the second outlet port is closed and said first flow path will cause the inlet port to be placed in communication with the first outlet port; the pistonlike body also having a second flow path such that when the pistonlike body is moved to a second setting the first outlet port is closed and said second flow path will cause the inlet port to be placed in communication with said second outlet port, the pistonlike body having sealing means encircling the first flowpath at its inlet end and also at its outlet end, said sealing means comprising a channel in the pistonlike body, each channel encircling the first flow path and containing a sealing ring, the pistonlike body having a bore to each channel through which a pressure medium can be fed to force said sealing rings to move outwardly of their channels into engagement with the walls of the housing.

2. A valve as claimed in claim 1 and wherein said inlet port and first outlet port are axially aligned on opposite sides of the housing and said first flow path is straight.

3. A valve comprising a housing, an inlet port in the housing, a first outlet port in the housing, a second outlet port in the housing, a pistonlike body slidable in said housing, the pistonlike body having a first flow path such that when the pistonlike body is moved to a first setting the second outlet port is closed and said first flow path will cause the inlet port to be placed in communication with the first outlet port; the pistonlike body also having a second flow path such that when the pistonlike body is moved to a second setting the first outlet port is closed and said second flow path will cause the inlet port to be placed in communication with said second outlet port, the housing having sealing means on its inner surface encircling the inlet port and further sealing means on its inner surface, encircling the first outlet port, said sealing means comprising a channel in the housing, each channel encircling the port with which it is associated and containing a sealing ring, the housing having a bore to each channel through which a pressure medium can be fed to force said sealing rings to move outwardly of their channels into engagement with the ends of the first flow path when the first flow path is in alignment with said sealing rings.

4. A valve as claimed in claim 3 and wherein said inlet port and first outlet port are axially aligned on opposite sides of the housing and said first flow path is straight.

* * * * *